United States Patent
Snook

(10) Patent No.: US 6,654,420 B1
(45) Date of Patent: Nov. 25, 2003

(54) VIDEO ENCODING-METHOD

(75) Inventor: Daniel Snook, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/698,771

(22) Filed: Oct. 27, 2000

(30) Foreign Application Priority Data

Oct. 29, 1999 (EP) .......................................... 99402713

(51) Int. Cl.[7] ................................................. H04N 7/12
(52) U.S. Cl. ................................................. 375/240.16
(58) Field of Search ...................... 375/240.12, 240.13, 375/240.14, 240.15, 240.16, 240.24

(56) References Cited

U.S. PATENT DOCUMENTS 6,249,318 B1 * 6/2001 Girod et al. ........... 375/240.16
6,381,277 B1 * 4/2002 Chun et al. ............ 375/240.12
6,414,992 B1 * 7/2002 Sriram et al. .......... 375/240.13

OTHER PUBLICATIONS

The MPEG–4 Video Verification Model Version 10.0 ISO/IEC JTCI/SC29/WG11 of Feb. 1998.

* cited by examiner

*Primary Examiner*—Chris Kelley
*Assistant Examiner*—George A Bugg, Jr.

(57) ABSTRACT

The MPEG-4 standard describes four prediction modes: a direct prediction mode, a bidirectional prediction mode, a forward prediction mode, and a backward prediction mode. These modes may be used for the encoding of a block on the basis of a past reference frame and a future reference frame. Thus, for the encoding of a given block, the invention provides an advantageous strategy leading to the choice of a well adapted prediction mode among the four possible ones. The proposed strategy works in favor of the direct mode and gives criteria to be satisfied when using this particular prediction mode.

4 Claims, 2 Drawing Sheets

VIDEO ENCODING-METHOD

FIELD OF THE INVENTION

The invention relates to a method of encoding a sequence of pictures, each picture being partitioned into non-overlapping blocks of pixels.

The invention also relates to a filtering device for carrying out such a method.

BACKGROUND ART

The International Organization for Standardization has defined, in the MPEG-4 standard, requirements to be satisfied for devices dealing with interactive multimedia applications. This standard, first, defines a concept of Video Object Plane (VOP) as an entity directly accessible from the bitstream. A VOP may be a basic graphic or an audio primitive. The encoding of a picture therefore consists of subsequent encoding of VOPs present in the picture.

A sequence of pictures may be composed of I frames, P-frames and B-frames. An I-frame is coded according to an Intra mode using spatial redundancy within the picture without any reference to another frame. In addition to the spatial redundancy as for an I-picture, the coding of a P-frame uses temporal redundancy between the P-picture and a previous picture used as a picture reference, which is mostly the previous I or P-picture. A B-picture has two temporal references and is usually predictively encoded from a previous P or I-picture and the next I or P-picture already encoded and reconstructed.

The MPEG-4 standard defines four prediction modes for the encoding of a picture with reference to a past reference frame and a future reference frame. A first prediction mode is the direct coding. This prediction mode uses the bidirectional motion compensation derived from the H.263 approach which employs motion vectors derived for macroblocks of the future reference frame and scales them to derive forward and backward motion vectors for blocks in said picture to be encoded. A second prediction mode is the forward mode which uses forward motion compensation in the same manner as in MPEG-1/2 with the difference that a VOP is used for prediction instead of a picture. A third prediction mode is the backward coding which uses backward motion compensation in the same manner as in MPEG-1/2 with the difference that a VOP is used for prediction instead of a picture. A last prediction mode is the bidirectional coding which uses interpolated motion compensation in the same manner as MPEG-1/2 with the difference that a VOP is used for the prediction instead of a picture.

The MPEG-4 Video Verification Model version 10.0 ISO/IEC JTC1/SC29/WG11 of February 1998 discloses a strategy for the decision of a particular prediction mode among the four possible ones for the encoding of a B-VOP. For a B-block, an estimation of the error of the prediction, the sum of absolute differences (SAD) in this document, is derived for the four prediction modes and the prediction mode giving the smallest SAD is chosen for the encoding of the B-block. This proposed strategy has the main disadvantage of being very computational.

SUMMARY OF THE INVENTION

It is therefore an object of the invention to provide a more efficient method of coding, giving a good trade-off between speed and coding quality.

To this end, a method such as described in the introduction, comprises, for a block belonging to a picture to be encoded on the basis of a past reference frame and a future reference frame, hereafter referred to as a block to be encoded, at least the steps of:

deriving for a block in the future reference frame with the same location as the block to be encoded, an optimum motion vector on the basis of the past reference frame and a corresponding optimum prediction block in the past reference frame;

deriving the sum of absolute differences between the block in said future reference frame with the same location as the block to be encoded and the optimum prediction block in the past reference frame, hereafter referred to as SADref;

deriving for the block to be encoded, a forward motion vector (MVf) on the basis of the optimum motion vector and a corresponding forward prediction block in the past reference frame;

deriving the sum of absolute differences between the block to be encoded and the forward prediction block, hereafter referred to as SADf;

deriving for the block to be encoded, a backward motion vector on the basis of the optimum motion vector and a corresponding backward prediction block in the future reference frame;

deriving the sum of absolute differences between the block to be encoded and the backward prediction block, hereafter referred to as SADb;

encoding the block to be encoded according to a direct prediction mode if one of the three following conditions is satisfied:

the spatial coordinates of the optimum motion vector are within a given range;

the deviation of SADref towards SADb is smaller than a given threshold;

the deviation of SADref towards SADf is smaller than a given threshold.

Such a method favors the direct prediction mode when justified so as to avoid the computation of the forward, the backward and the bidirectional prediction mode when possible. Compared to a method proposed by the prior art, when the direct mode is chosen, there is no needed for a prior calculation of the sum of absolute differences associated to the direct mode, which is very computational. An advantage of the invention is a greater speed in the process of deciding an adapted prediction mode, because of the reduction of calculation costs.

BRIEF DESCRIPTION OF THE DRAWINGS

The particular aspects of the invention will now be explained with reference to the embodiments described hereinafter and considered in connection with the accompanying drawings, in which.

DETAILED DESCRIPTION OF THE INVENTION

A misuse of the word "block" may occur in the following paragraphs. When reading block, one should understand macroblock, as defined in the ITU standards.

Figure 1:
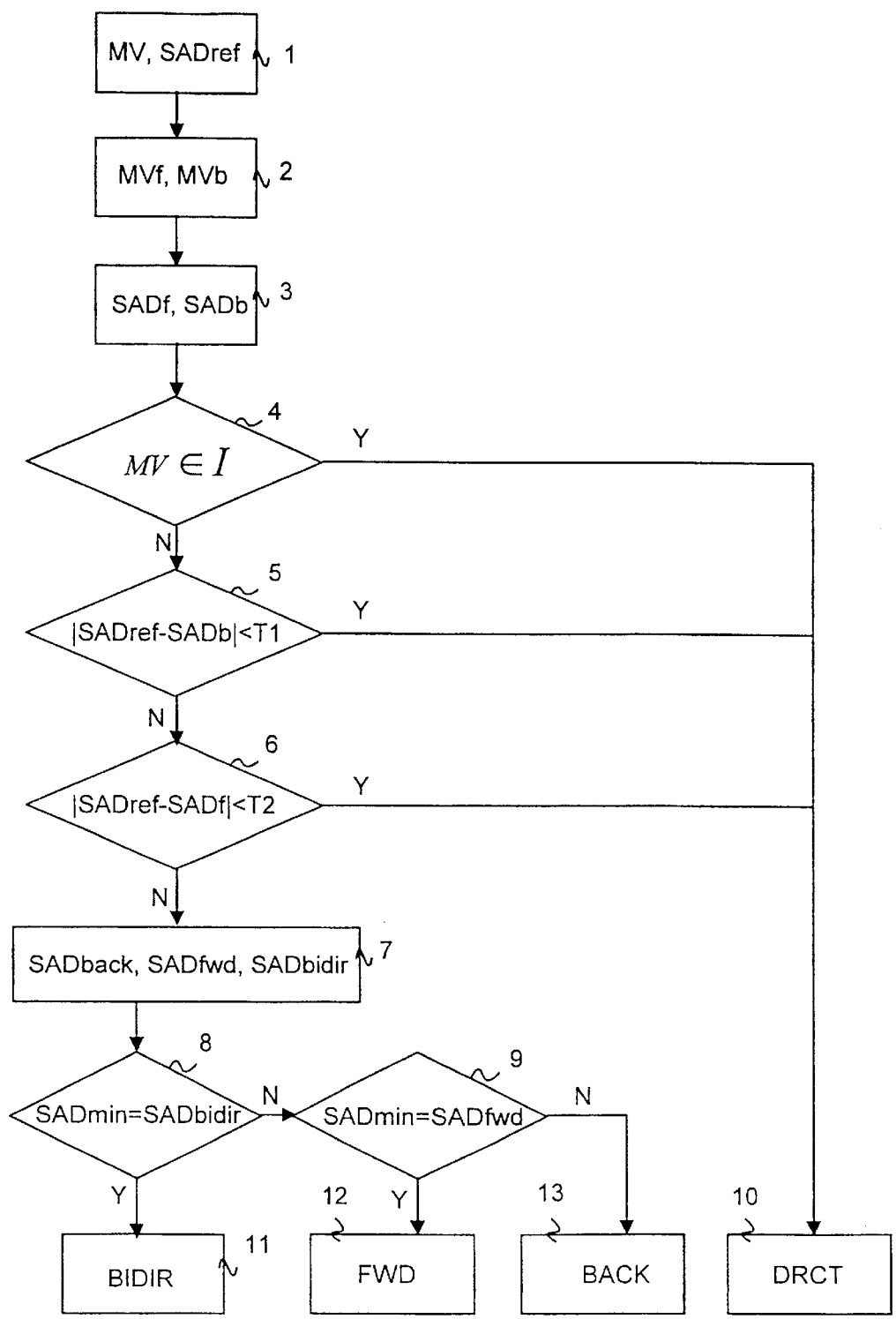
FIG. 1 shows various steps of a method in accordance with the invention.
Figure 2:
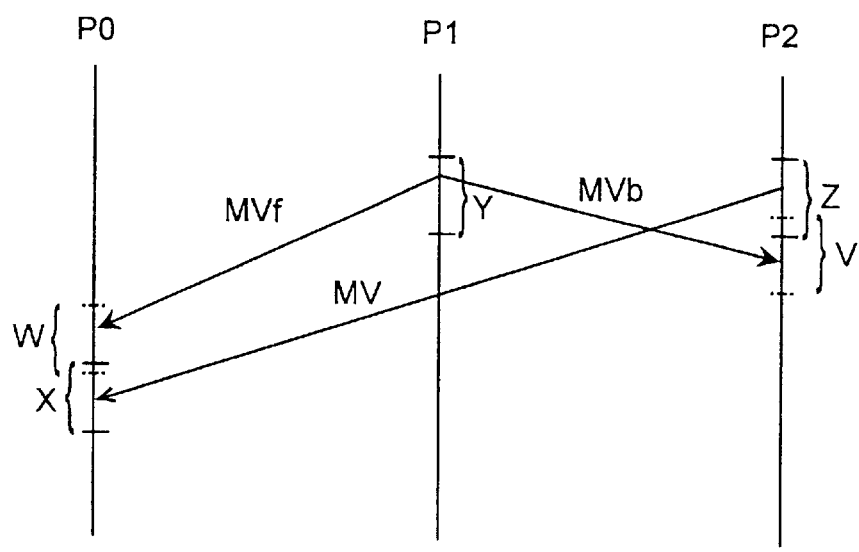
FIG. 2 depicts a direct prediction of a macroblock.

A method of coding in accordance with the invention is given in FIG. 1. Let us consider a sequence of pictures. A picture P1 may be encoded with reference to a past reference picture P0 and to a future reference picture P2, such as depicted in FIG. 2. P0 is preferably an I or a P-picture and P2 is preferably an I or a P-picture. Each picture, for encoding purposes, is also partitioned into non-overlapping blocks of pixels and the encoding of a VOP consists of the encoding of the blocks covering it. The method, given in FIG. 1, is a strategy for the choice of the prediction mode to be used in the encoding of a block Y of the picture P1. The block Y is in an embodiment of the invention of size 16×16.

A first step 1 of the method in FIG. 1 consists of performing a motion compensation for a block Z in the future reference frame P2 with the same location as the block Y, on the basis of the past frame P0. To this end, an optimum motion vector MV is derived for a B-block. This vector MV may possibly be derived by minimizing a function SAD (Sum of Absolute Differences) given in Equation (1):

$$SAD = \sum_{m=1}^{16}\sum_{n=1}^{16} |B_{i,j}(m, n) - B_{i-u, j-v}(m, n)| \qquad (1)$$

where $B_{i,j}$ (m, n) represents the (m,n)th pixel of the 16×16 block Y at the spatial location (i,j) and $B_{i-u,j-v}$ (m, n) represents the (m,n)th pixel of a candidate macroblock in the past reference picture P0 at the spatial location (i,j) displaced by the vector (u,v). The optimum motion vector MV is the displacement (u,v) between the block Z and the candidate macroblock, block X, in the P0-frame giving the smallest SAD, hereafter referred to as SADref.

A second step 2 consists of the derivation of a non-refined forward motion vector MVf and of the derivation of a non-refined backward motion vector MVb on the basis of the optimum motion vector MV previously derived in step 1. The calculations of the motion vectors MVf and MVb are given in the standard MPEG-4 as shown in Equation (2) with a null refinement vector MVd:

$MVf=(TRb\times MV)/TRd$ $MVb=((TRb-TRd)\times MV)/TRd$ $MVb=MVf-MV \qquad (2)$ where TRb is the increment in the temporal reference of the frame P1 from the past reference frame P0, and TRd is the increment in the temporal reference of the future reference frame P2 from the past reference frame P0. These non-refined motion vectors MVf, MVb, associated to the block Y, define corresponding blocks in the past reference frame P0 and in the future reference frame P2, respectively hereafter referred to as a block W of the frame P0 and a block V of the frame P2.

Then, in a step 3 the sum of absolute difference is derived between the block Y and the block W, hereafter referred to as SADf, and the sum of absolute difference between the block Y and the block V, hereafter referred to as SADb, is also derived.

In steps 4, 5 and 6 of a method according to the invention, a condition is stated in each step allowing to determine if the direct prediction mode has to be used in the encoding of the block Y. According to the invention, the block Y is necessarily directly encoded in a step 10 when at least one condition among the conditions defined in steps 4, 5, 6, explained in detail hereinafter, is fulfilled.

First, in the step 4 a condition is stated concerning the values of the spatial coordinates of the motion vector MV. Indeed, the block Y shall be direct encoded in the step 10 when the spatial coordinates of the motion vector MV lie within a given range I. In an embodiment of the invention, the spatial coordinates of the motion vector MV must lie in the range [−2;2] in a half pixel unit. As a consequence, this criterion ensures a low movement between the frames P0, P1 and P2 and it also ensures that, thanks to the possibility of refinement by a vector MVd, as explained in the standard MPEG-4, the direct prediction mode will provide a good prediction for the block Y. When this first criterion is not fulfilled, additional conditions are stated in steps 5 and 6.

In step 5, as well as in step 6, a condition is stated concerning the coherence between, on the one hand, the non-refined forward and backward motion estimations of the block Y on the basis of the frames P0 and P1, respectively, and, on the other hand, the motion estimation of the block Z on the basis of the frame P0. In the step 5, the deviation between SADb and SADref is derived and when the absolute value of the deviation is smaller than a given threshold T1, the block Y shall be directly encoded in step 10. Otherwise, in the step 6, the deviation between SADf and SADref is derived and when the absolute value of the deviation is smaller than a given threshold T2, the block Y shall be directly encoded in step 10. In an embodiment of the invention, the thresholds T1 and T2 are equal. In an embodiment of the invention, step 6 is performed before step 5. These steps 5 and 6 allow to give an estimation of the quality of the direct coding. Indeed, SADref was previously obtained as the sum of absolute difference providing the best prediction of the block Z on the basis of the frame P0. Thus, considering that SADf or SADb does not deviate much towards SADref ensures that the use of the direct prediction mode for the encoding of the block Y leads to a prediction of good quality, or at least almost as good as the prediction obtained with SADref for the block Z.

In a preferred embodiment of the invention, the method, such as depicted in FIG. 1, comprises additional steps allowing to decide which prediction mode to choose for the encoding of the block Y among the forward, backward and bidirectional ones, when the direct mode had been rejected in steps 4 to 6 because none of the conditions mentioned above was fulfilled. To this end, a backward motion estimation of the block Y on the basis of the future reference frame P2 is performed in a step 7. This motion estimation consists of the derivation of the minimum of the function SAD between the block Y and candidates macroblocks belonging to the frame P2 using Equation (1). The minimum is hereafter referred to as SADbck. The value SADbck defines a candidate macroblock A of the frame P2 and the sum of absolute difference associated to a backward prediction of the block Y. In the same manner, a forward estimation of the block Y is also performed on the basis of the past reference frame P0 resulting in a minimum SAD, hereafter referred to as SADfwd, between the block Y and a candidate macroblock B belonging to the frame P0. SADfwd is the sum of absolute differences associated to the forward prediction of the block Y. In addition, an average of the macroblocks A and B is also derived and the sum of absolute differences is derived as SADbidir. SADbidir is the sum of absolute differences associated to the bidirectional prediction of the block Y. SADfwd, SADbck and SADbidir represent the respective errors resulting from a forward, backward and a bidirectional prediction of the block Y. In this preferred embodiment of the invention, the block Y is encoded according to the prediction mode giving the smallest error.

Thus, in the step 7 the three values SADfwd, SADbck and Sadbidir are compared and their minimum SADmin is derived. In a step 8, if SADbidir equals SADmin, the block Y is encoded following the bidirectional prediction mode in a step 11. In a step 9, if SADfwd equals SADmin, the block Y is encoded following the forward prediction mode in a step 12. Otherwise, if SADbck equals SADmin, the block Y is encoded following the backward prediction mode in a step 13.

A sequence of pictures may be composed of successive I, P and B-frames. The encoding of such a sequence of pictures may be as follows. First the I-frame is encoded following an Intra mode, then the P-frame is encoded with reference to the I-frame and, finally, the B-frame is encoded with reference to the past I-frame and the future P-frame. Since the encoding of the P-frame is performed before the encoding of the B-frame, at the stage of the encoding of the B-frame, the parameters related to the motion compensation of the blocks of the P-frame on the basis of the past I-frame are already available. Thus, in a method according to the invention, a frame P1 to be coded with reference to a past reference frame P0 and a future reference frame P2 is coded after the coding of the frame P0 and the coding of the frame P2. As a result, in a method of coding such as depicted in FIG. 1, the optimum motion vector MV and the error SADref issuing from the motion estimation of the past reference frame P2 described in step 1 can be taken from the prior encoding of the frame P2. Such a method according to the invention does not imply high CPU costs.

It is to be noted that, with respect to the described coding method, modifications or improvements may be proposed without departing from the scope of the invention. For instance, it is clear that this coding method can be implemented in several manners, such as by means of wired electronic circuits or, alternatively, by means of a set of instructions stored in a computer-readable medium, said instructions replacing at least part of said circuits and being executable under the control of a computer or a digital processor in order to carry out the same functions as fulfilled in said replaced circuits. The invention then also relates to a computer-readable medium comprising a software module that includes computer-executable instructions for performing the steps, or some steps, of the described method. The blocks of FIG. 1 represent both a step of a method in accordance with the invention and a processing circuit of a global encoding device for performing such a step.

What is claimed is:

1. A method of encoding a sequence of pictures, each picture being partitioned into non-overlapping blocks of pixels, the method comprising, for a block (Y) belonging to a picture (P1) to be encoded on the basis of a past reference frame (P0) and a future reference frame (P2), hereafter referred to as a block to be encoded, at least the steps of:
    deriving for a block (Z) in the future reference frame with the same location as the block to be encoded, an optimum motion vector (MV) on the basis of the past reference frame and a corresponding optimum prediction block (X) in the past reference frame;
    deriving the sum of absolute difference between the block in said future reference frame with the same location as the block to be encoded and the optimum prediction block in the past reference frame, hereafter referred to as SADref;
    deriving for the block to be encoded, a forward motion vector (MVf) on the basis of the optimum motion vector and a corresponding forward prediction block (W) in the past reference frame
    deriving the sum of absolute difference between the block to be encoded and the forward prediction block, hereafter referred to as SADf;
    deriving for the block to be encoded, a backward motion vector (MVb) on the basis of the optimum motion vector and a corresponding backward prediction block (V) in the future reference frame;
    deriving the sum of absolute differences between the block to be encoded and the backward prediction block, hereafter referred to as SADb;
    encoding the block to be encoded according to a direct prediction mode if one of the following conditions is satisfied:
        the spatial coordinates of the optimum motion vector are within a given range (I);
        the deviation of SADref towards SADb is smaller than a given threshold;
        the deviation of SADref towards SADf is smaller than a given threshold.

2. A method of encoding as claimed in claim 1, wherein, when none of the conditions of the last step is fulfilled, the method further comprises at least the steps of:
    deriving the minimum of the sum of absolute difference between the block to be encoded and the blocks of the past reference frame, this minimum being hereafter referred to as SADfwd and the corresponding block of the past reference frame being hereafter referred to as forward reference block;
    deriving the minimum of the sum of absolute differences between the block to be encoded and the blocks of the future reference frame, this minimum being hereafter referred to as SADbck and the corresponding block of the future reference frame being hereafter referred to as backward reference block;
    deriving the sum of absolute differences between the block to be encoded and a block being the average of the future reference block and the past reference block, this sum of absolute differences being hereafter referred to as SADbidir;
    when SADfwd is lower than both SADbck and SADbidir, encoding the block to be encoded according to a forward prediction mode;
    when SADbck is lower than both SADfwd and SADbidir, encoding the block to be encoded according to a backward prediction mode;
    when SADbidir is lower than both SADbck and SADfwd, encoding the block to be encoded according to a forward prediction mode.

3. A filtering device for carrying out a method of encoding a sequence of pictures as claimed in claim 1.

4. A storing medium comprising a software module that stores a set of instructions executable under the control of a computer or a processor and performs at least some of the steps of the encoding method as claimed in claim 1.

* * * * *